(12) United States Patent
Knibbe

(10) Patent No.: US 9,983,313 B2
(45) Date of Patent: May 29, 2018

(54) SYSTEM AND METHOD FOR DETECTING PHYSICAL DEFORMATION OF A POLE

(71) Applicant: PHILIPS LIGHTING HOLDING B.V., Eindhoven (NL)

(72) Inventor: Engel Johannes Knibbe, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days. days.

(21) Appl. No.: 14/426,184

(22) PCT Filed: Aug. 4, 2014

(86) PCT No.: PCT/EP2014/066671
§ 371 (c)(1),
(2) Date: Mar. 5, 2015

(87) PCT Pub. No.: WO2015/022213
PCT Pub. Date: Feb. 19, 2015

(65) Prior Publication Data
US 2016/0146943 A1 May 26, 2016

(30) Foreign Application Priority Data
Aug. 16, 2013 (EP) ..................................... 13180716

(51) Int. Cl.
*G01S 19/14* (2010.01)

(52) U.S. Cl.
CPC .................................. *G01S 19/14* (2013.01)

(58) Field of Classification Search
CPC ........................................................ G01S 19/14
See application file for complete search history.

(56) References Cited

U.S. PATENT DOCUMENTS

| 8,423,637 B2* | 4/2013 | Vaswani | G01D 4/004 709/223 |
| 8,604,964 B2* | 12/2013 | Eidloth | G01S 5/14 342/114 |
| 2010/0013608 A1 | 1/2010 | Petrisor | |
| 2011/0227722 A1 | 9/2011 | Salvat | |

(Continued)

FOREIGN PATENT DOCUMENTS

| CN | 101638902 A | 2/2010 |
| CN | 101968389 A | 2/2011 |

(Continued)

*Primary Examiner* — Cassi J Galt

(57) ABSTRACT

A pole (110), such as a street light or a traffic light, can, for example, break due to being hit by a car or bend due to being exposed to high winds. A system (100) for detecting physical deformation of a pole (110) comprises a signal processor (130) coupled to an antenna (120) arranged to receive a wireless signal (150). The signal processor (130) determines position data based on the wireless signal (150). A processor (140) analyzes position data to determine whether there is a variation between first position data relating to a first time period and second position data relating to a subsequent time period. When the pole (110) has been physically deformed between the first and the second time period, the first and second position data will vary and the processor determines that the pole has been physically deformed.

11 Claims, 5 Drawing Sheets

(56) References Cited

U.S. PATENT DOCUMENTS

| | | | | | |
|---|---|---|---|---|---|
| 2011/0288777 | A1* | 11/2011 | Gupta | ................... | G06Q 10/06 |
| | | | | | 702/5 |
| 2013/0057158 | A1 | 3/2013 | Josefowicz | | |
| 2013/0181609 | A1* | 7/2013 | Agrawal | ................ | H05B 37/03 |
| | | | | | 315/131 |
| 2014/0067284 | A1* | 3/2014 | Breed | ................... | E05F 15/43 |
| | | | | | 702/34 |
| 2014/0278150 | A1* | 9/2014 | Baesler | .................. | E04H 12/00 |
| | | | | | 702/34 |

FOREIGN PATENT DOCUMENTS

| | | | |
|---|---|---|---|
| CN | 102278970 | A | 12/2011 |
| CN | 102421064 | A | 4/2012 |
| CN | 102943493 | A | 2/2013 |
| EP | 866434 | B1 | 6/2004 |
| JP | 1187347 | A | 3/1999 |
| JP | 2001202587 | A | 7/2001 |
| JP | 2002154435 | A | 5/2002 |
| JP | 2004147374 | A | 5/2004 |
| JP | 2005121464 | A | 5/2005 |
| RU | 113394 | A | 2/2012 |
| WO | 2011142516 | A1 | 11/2011 |
| WO | 2013003972 | A1 | 1/2013 |

* cited by examiner

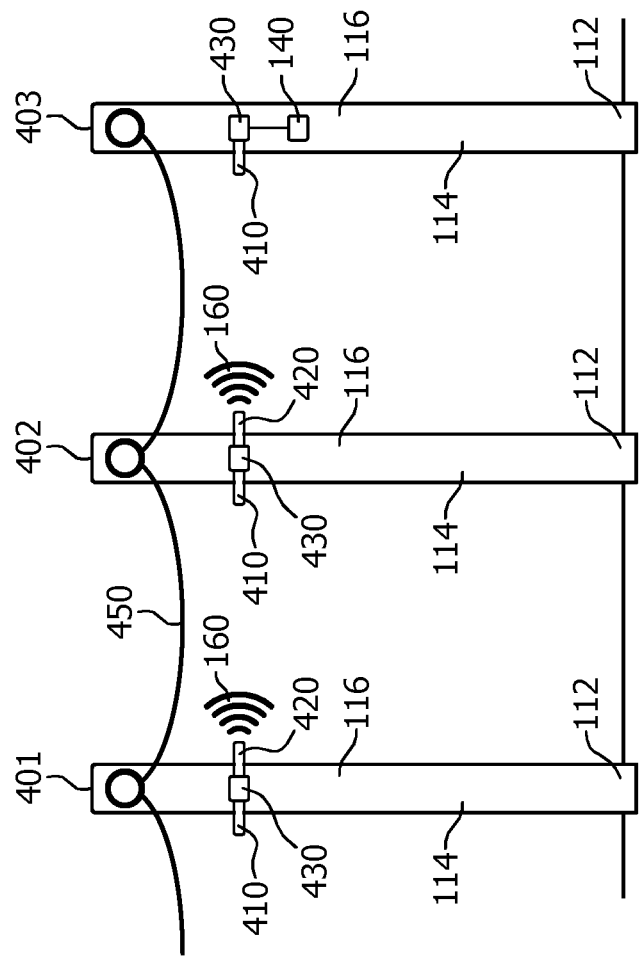
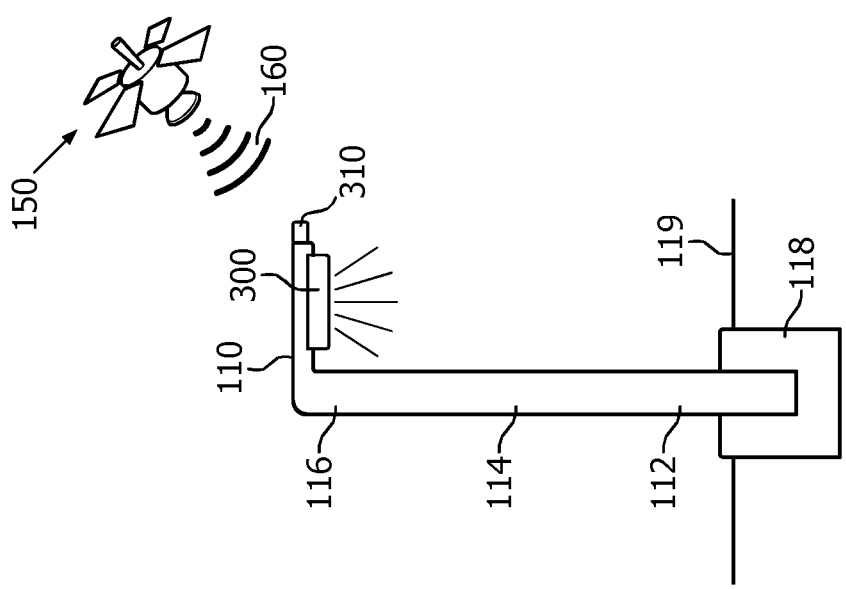
FIG. 4
FIG. 3

SYSTEM AND METHOD FOR DETECTING PHYSICAL DEFORMATION OF A POLE

CROSS-REFERENCE TO PRIOR APPLICATIONS

This application is the U.S. National Phase application under 35 U.S.C. § 371 of International Application No. PCT/EP2014/066671, filed on Aug. 4, 2014, which claims the benefit of European Patent Application No. 13180716.6 filed on Aug. 16, 2013. These applications are hereby incorporated by reference herein.

FIELD OF THE INVENTION

The present invention generally relates to methods and systems for detecting physical deformation of an outdoor object and specifically to methods and systems for detecting physical deformation of a pole.

BACKGROUND OF THE INVENTION

A pole placed outdoors, such as a street light, a flagpole or a utility pole, can be damaged by a vehicle driving into it, atmospheric conditions (e.g. storms, hurricanes) and other events. In many cases the occurrence of such an event requires that the outdoor object be repaired or replaced. It is known from, for example, WO-2011121470-A1, to monitor an outdoor lighting fixture node (a street light) for failure. This allows automatic detection of failure and allows, for example, a maintenance crew to be dispatched based on such failure detection. However, if the outdoor object is a pole that is physically deformed, the electrical device, such as the light fixture, can still be operational, hence no failure is detected. There is therefore a need for detection of physical deformation of a pole.

JP-2001202587-A describes a device for measuring vibrations in a lighting pole. It uses known sensors and transmits measured values related to sensor readings via a wireless network.

WO-2011142516-A1 describes a lighting pole with integrated sensors. The measured values related to sensor readings are transmitted via a wireless network.

SUMMARY OF THE INVENTION

It is an object of the invention to provide a system for detecting physical deformation of a pole. It is a further object of the invention to provide a device for detecting physical deformation of a pole arranged for use in a system according to the invention. It is yet a further object of the invention to provide a method and computer program product for detecting physical deformation of a pole.

In a first aspect of the invention a system is provided for detecting physical deformation of a pole, the pole comprising at least a base section where the pole is coupled to an anchoring base, an intermediate section where the pole is susceptible to physical deformation, and an end section. These sections need not be physically distinct parts of the pole, but instead can be areas of the pole (e.g. bottom, middle, top). The system comprises: an antenna, coupled to the pole in the end section, arranged for receiving a wireless signal; a signal processor, coupled to the antenna, arranged for determining position data based on the received wireless signal; and a processor, coupled to the signal processor, arranged for analyzing the position data. The signal processor is further arranged to determine, based on the wireless signal, at least first position data in a first time period and at least second position data in a subsequent time period. The processor is further arranged to analyze the at least first position data and the at least second position data to determine that the pole has been physically deformed in at least the intermediate section between the first time period and the second time period, based on variation between the at least first position data and the at least second position data.

In an embodiment of the system according to the invention the signal processor is arranged to determine position data based on any one of: information encoded in the wireless signal, timing information related to receiving the wireless signal and/or measuring signal strength of the wireless signal. Quality of position data can be enhanced by using more than one of these (or other) means of determining position data. Position data can, for example, be geographical data (e.g. coordinates) or relative position data (e.g. signal strength).

In a further embodiment of the system according to the invention the antenna is arranged to receive a wireless signal from a satellite and the signal processor is arranged to determine a geographic location as position data. The antenna and signal processor can be combined, for example, in a single GPS receiver unit. Next to GPS, there are other positioning systems that can be used alternatively or in combination with GPS, such as: GLONASS, Galileo, Beidou, COMPASS, IRNSS and QZSS.

In various embodiments of the system according to the invention, the processor is coupled to the pole (e.g. embedded in the pole), located at a location remote to the pole (e.g. in a traffic signal control box next to a traffic light) or combined with the signal processor (e.g. in a single unit, a standalone unit). The processor can be further arranged to analyze position data pertaining to at least a second pole. This can, for example, lower component costs as a processor is shared. Additionally or alternatively this can allow for determining that the pole has not been physically deformed based on the position data pertaining to at least the second pole (e.g. through determining that a variation in position data occurs amongst multiple poles). This is beneficial as it can prevent a false positive detection of a physically deformed pole. As additional examples, the processor can be part of another system (e.g. a lighting device controller) and provide processing capabilities to the system according to the invention; and/or the system can make use of distributed processing or cloud processing, where processing capabilities of multiple processors, various processors or virtual processors are used. Each of these embodiments provides benefits, such as, sharing a processor to decrease components costs or embedding a processor to create a standalone unit.

In yet another embodiment the system further comprises the pole. This is advantageous as it provides a turnkey type solution. The pole can be installed providing the functionalities of the system according to the invention.

In a second aspect of the invention, a device comprising the processor of the system according to the invention is provided. The device can be used in combination with a pole that is equipped with, for example, a GPS receiver coupled to the end section (e.g. for commissioning or tracking purposes). Through analyzing the position data provided by the GPS receiver, the device can provide an indication that the pole is physically deformed.

In a third aspect of the invention, a method is provided for detecting physical deformation of a pole, the pole comprising at least a base section where the pole is coupled to an anchoring base, an intermediate section where the pole is susceptible to physical deformation; and an end section. The method comprises the steps of: determining at least first position data, in a first time period, based on a wireless signal received through an antenna coupled to the pole in the end section; determining at least second position data, in a subsequent time period, based on the wireless signal received through the antenna; analyzing the at least first position data and the at least second position data to determine a variation between the at least first position data and the at least second position data; and determining, based on the variation, that the pole has been physically deformed in at least the intermediate section between the first time period and the second time period.

In a fourth aspect of the invention, a computer program product is provided comprising software code portions for performing the steps of the method according to the third aspect of the invention, when said product is executed on a computer.

It shall be understood that the system, the pole, the device, the method and the computer program product have similar and/or identical preferred embodiments, in particular, as defined in the dependent claims. It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

In the following figures:

FIG. 3 shows schematically an embodiment of the system according to the invention comprising a GPS receiver;

FIG. 4 shows schematically an embodiment of the system according to the invention comprising a processor shared amongst multiple utility poles;

DETAILED DESCRIPTION OF THE FIGURES

Figure 1:
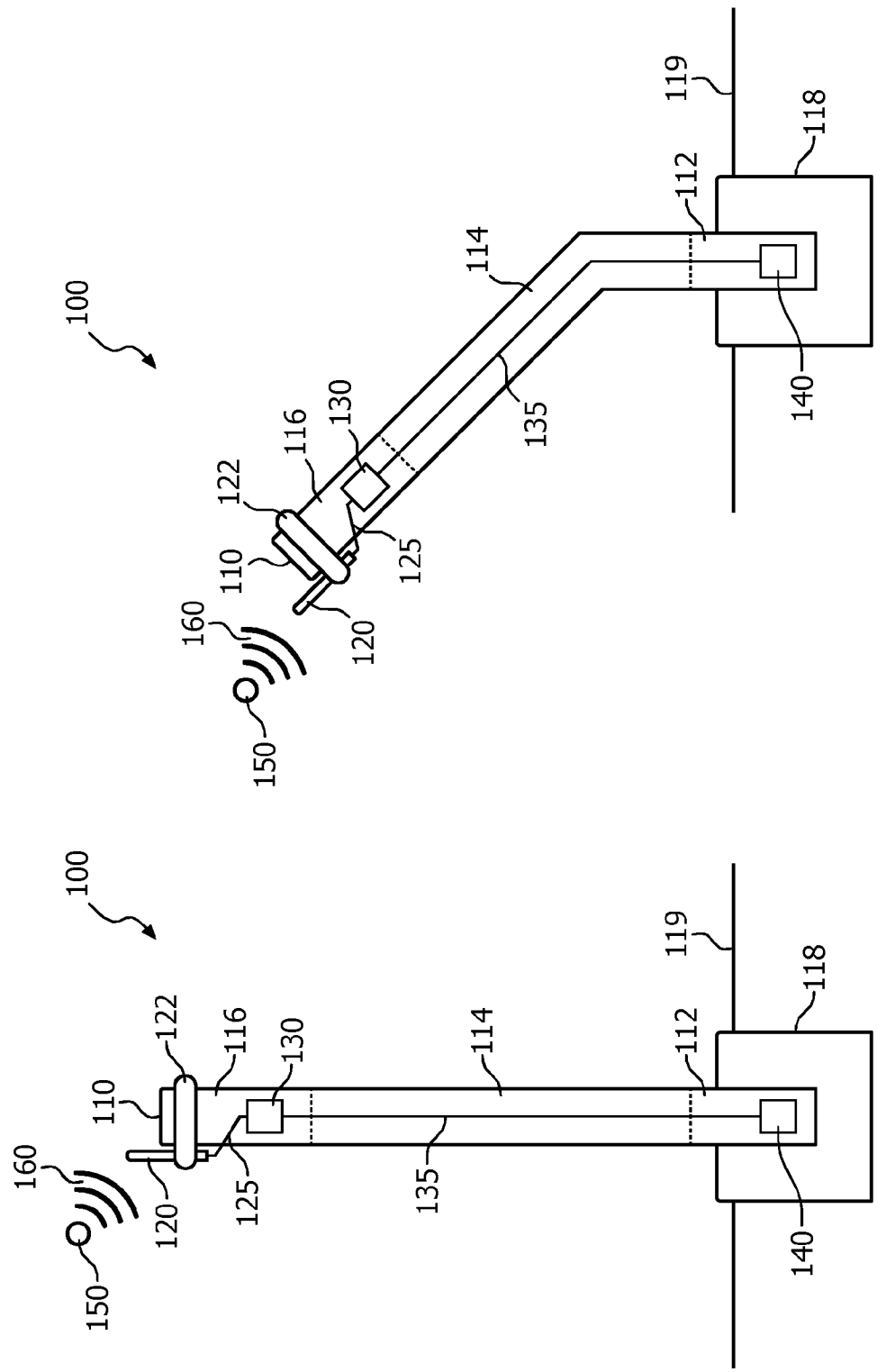
FIG. 1A, B show schematically and exemplarily a system for detecting physical deformation of a pole according to the invention.

In FIG. 1A, a system 100 for detecting physical deformation of a pole according to the invention is shown in combination with a pole 110. The terminology 'physically deformed' is used here to indicate the pole being bent, broken, twisted, folded, etc. The pole 110 comprises a base 112, intermediate 114 and end section 116. These sections need not be physically distinct parts of the pole 110. In this example the sections are virtual sections of the pole and the dotted lines in FIG. 1 indicate where one section ends and the other begins. Although only three sections are shown, there can be more sections, sections can overlap, sections can be any shape or form, etc. The base section 112 is where the pole 110 is coupled to an anchoring base, in this example the pole 110 is coupled through a (concrete) socket 118 to the ground 119. The end section 116 is where the antenna 120 is coupled to the pole 110, in this example the antenna 120 is coupled to the pole 110 through a tie wrap 122. The intermediate section 114 is, in this example, the part between the base 112 and end 116 sections. If the pole 110 were to be hit by, for instance, a car driving into it, the pole 110 might remain attached to the socket 118 yet become physically deformed in at least the intermediate section 114. This can cause the end section 116 to be displaced. In this example the end section 116 is the top of the pole 110 and the antenna 120 is coupled to this top of the pole 110. The antenna 120 could however be coupled to the pole 110 at a different position, for example at a certain distance (e.g. 1 meter or 2 meters) from the base section 112 or halfway up the pole 110.

The system 100 comprises the antenna 120 which is coupled 125 to a signal processor 130 which is in turn coupled to a processor 140. The antenna 120 is arranged to receive, from a wireless signal source 150, a wireless signal 160. The signal processor 130 is arranged to determine, based on the wireless signal 160 as received through the antenna 120, position data (not shown). First position data are determined in a first time period and second position data in a subsequent time period. The processor 140 is arranged to analyze the position data and determine that the pole 110 has been physically deformed based on a variation between the at least first position data and second position data.

The wireless signal 160 received by the antenna 120 can be global, regional or local positioning data received from, for example, a satellite. The US government maintained Global Positioning System (GPS) is a collection of satellites each comprising a wireless signal source 150 providing a wireless signal 160. Other examples are the Russian GLONASS satellite system, the European Galileo satellite system, the Chinese Beidou and COMPASS satellite systems, the Indian IRNSS satellite system and the Japanese QZSS satellite system. The wireless signal 160 broadcasted by such systems contains information, such as orbital data and signal transmission time, that allow the signal processor 130 to determine position data; in this case geographical location data such as coordinates.

In another example, the wireless signal 160 received by the antenna 120 can be a wireless signal 160 emitted by a beacon like device. A router in a (semi) fixed position can emit a wireless signal 160 which can be used to determine position data, for instance by measuring signal strength to determine the antenna's 120 relative position to the wireless signal source 150. A strong signal can relate to the antenna being close to the wireless signal source 150. A weak signal can relate to the antenna being far from the wireless signal source 150. A sudden variation in measured signal strength from a strong signal to a weak signal can be the basis for determining that the pole 110 has physically deformed.

In yet another example, time of flight related data is determined in relation to the wireless signal 160 received by the antenna 120. The signal processor 130 can, for instance, generate a signal (not shown) that is sent via the antenna 120 to the wireless signal source 150 which receives this signal and replies by emitting a wireless signal 160. Time between this signal being sent and the wireless signal 160 being received is an indication of distance between the antenna 120 and the wireless signal source 150. Any single one of these as well as a combination of such technologies can be employed by the system 100. Furthermore, these are merely some examples of how position data can be determined.

FIG. 1B shows the pole 110 and the system 100 as shown in FIG. 1A, yet now after an event has occurred that has led to the pole 110 to become physically deformed, and more specifically, become bent in the intermediate section 114. The position data as determined by the signal processor 130 based on the received wireless signal 160 will vary in the situation as depicted in FIG. 1B from the position data determined in the situation as depicted in FIG. 1A. As an example, if the position data is a geographic location (e.g. coordinates) the location in the first and second situation can be different (e.g. 1 meter, or a fraction of a degree apart); if the position data is a derivative of measured signal strength it can vary between these two situations (e.g. signal strength dropping from 15 dBm to 12 dBm, or, vice versa, the signal strength increasing); if the position data comprises time of flight measurements, the time of flight can vary between these two situations (e.g. a difference of 1 ms). The processor 140 analyzes first position data from the first time period, in this example, before the pole 110 was physically deformed and second position data from the subsequent time period, after the pole 110 has been physically deformed. If the variation between the first and second position data is larger than a threshold value (e.g. 1 m, 3 dBm or 1 ms), it is determined that the pole 110 is physically deformed.

Multiple measurements can be taken to lower the chance of false positives (i.e. determining the pole 110 has been physically deformed when this is not the case) and/or the chance of false negatives (i.e. determining the pole 110 has not been physically deformed when instead it has been physically deformed). As an example, the variation between multiple instances of first position data (e.g. due to wireless signal interference) can be used to determine the threshold the processor 140 employs in comparing first and second position data. Alternatively or additionally the processor 140 can analyze multiple instances of second position data to determine if the variation between first and second position data remains stable (e.g. to rule out movement of the end section of the pole 110 due to high winds).

If the processor 140 determines that the pole 110 has been physically deformed, the processor 140 can be further arranged to provide a signal (not shown) to indicate that the pole 110 is physically deformed. Such a signal can be sent to a central control system, for example if the pole 110 is a street light, the city's street light control system can receive this signal (e.g. wirelessly, via power line communications or via a control wire).

Figure 2:
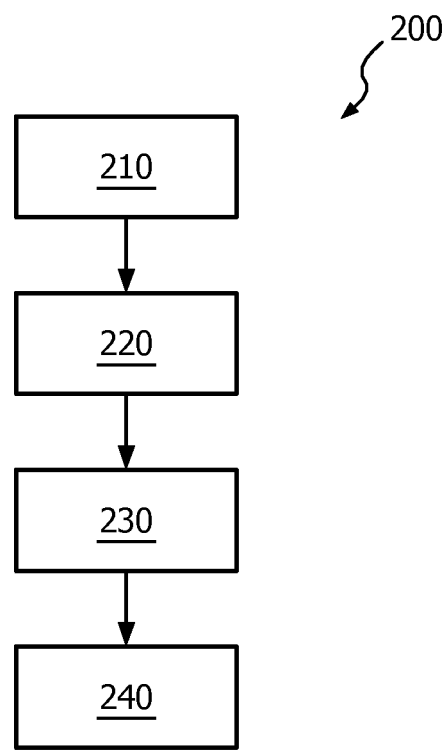
FIG. 2 shows schematically and exemplarily a method for detecting physical deformation of a pole according to the invention.

In FIG. 2 a method 200 for detecting physical deformation of a pole according to the invention is illustrated. In a first 210 and second 220 step, respectively, at least first position data and second position data are determined. The first position data can relate to a first time period before the pole has physically deformed, whereas the second position data can relate to a subsequent time period after the pole has been physically deformed. Position data, as mentioned before, can be a geographic location (e.g. coordinates), relative position data, signal strength, time of flight or any other type of data that is indicative of the position of the pole and more specifically the antenna coupled to the pole.

The third step 230 comprises analyzing the first and second position data to determine a variation between these. The variation can simply be the difference between first position data and second position data, but more complex algorithms can be used to increase the quality of data analysis. For instance, the amount of variation in position data over time, the ratio between short term and long term variation and other factors can be taken into account in the applied algorithm. Finally, the fourth step 240 comprises determining, based on the determined variation, whether or not the pole has been physically deformed.

FIG. 3 shows, as a further example, the system implemented in a single unit 310 attached to the pole 110 equipped with a lighting device 300. This embodiment of the system according to the invention allows for a street light to be retrofitted with the system. The single unit 310 comprises an integrated antenna, signal processor and processor. It can be a standalone unit or part of another system (not shown) providing broader functionalities, such as the Philips Starsense telemanagement system for monitoring, controlling, metering and diagnosing outdoor lighting. In this example, the single unit 310 is externally attached to the pole 110, but likewise it could be internally attached. As a further example, the single unit 310 could share an antenna (not shown) already coupled to the pole 110 as part of such another system. As yet a further example, the single unit 310 can comprise merely an integrated antenna and signal processor, with the processor located at a remote location.

In FIG. 4 multiple utility poles 401, 402, 403 are shown. Two poles 401, 402 have two antennas 410, 420 and one pole 403 has one antenna 410. In this example a receiving antenna 410 and a transmitting antenna 420 are arranged to, respectively, receive and transmit a wireless signal 160. The signal received by the second pole 402 from the first pole 401 can comprise position data related to the first pole 401. A signal processor 430 can be arranged to receive this signal, append to it position data related to the pole 402 receiving this signal and then transmit this signal now comprising position data related to both poles 401, 402. The pole 403 with the processor 140 can analyze the position data extracted from the wireless signal 160 by the signal processor 430. It can determine that a pole has been physically deformed or it can be arranged to determine which specific pole 401, 402, 403 has been physically deformed. A signal (not shown) indicating that a pole 401, 402, 403 has been physically deformed can be sent to a central server (not shown) via power line communications over the power cable 450 connected to the poles 401, 402, 403.

Figure 5:
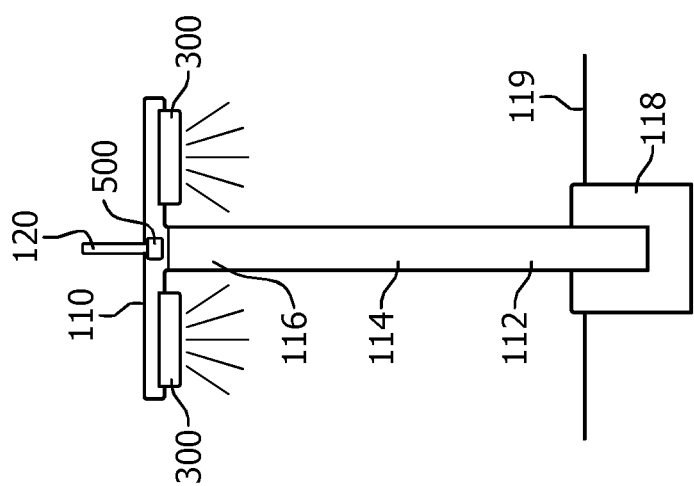
FIG. 5 shows schematically an embodiment of the system according to the invention comprising a street light with an antenna on top.

FIG. 5 provides an example of the system implemented in an embedded unit 500 that utilizes an antenna 120 already present on the pole 110. The embedded unit comprises the signal processor and the processor and is coupled to the antenna 120. As a further example, this pole 110 comprises two lighting devices 130 and instead of a single embedded unit 500 and a single antenna 120 (as shown) it could be equipped with two embedded units and two antennas (not shown), each at opposite ends of the T-bar at the top of the pole 110 shown.

Figure 6:
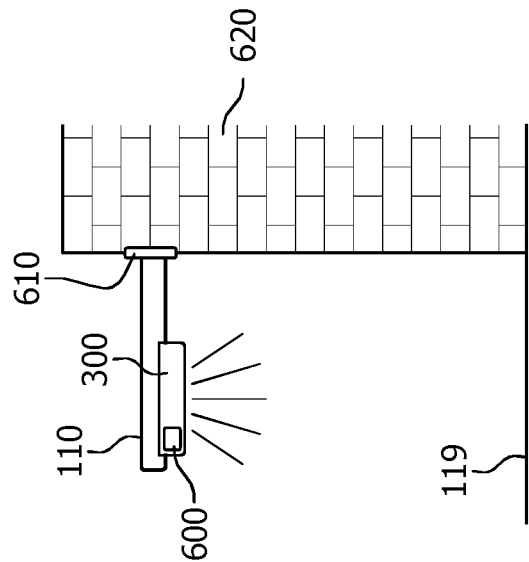
FIG. 6 shows schematically an embodiment of the system according to the invention embedded in the lighting device, said lighting device placed in a light fixture anchored to a wall.

In FIG. 6 the system according to the invention is provided in a single unit 600 that can be embedded in the lighting device 300. This is similar to the embodiment depicted in FIG. 3, yet in this example the single unit 600 can, for example, be placed between a fluorescent tube and the lamp holder, between a compact fluorescent lamp and the lamp socket, etc. In this example, the pole 110 is coupled via a bracket 610 to a wall 620 as an example that the system according to the invention is not restricted to a vertically placed pole. The system can be arranged to detect physical deformation of, for example, horizontally, vertically or diagonally placed poles.

Figure 7:
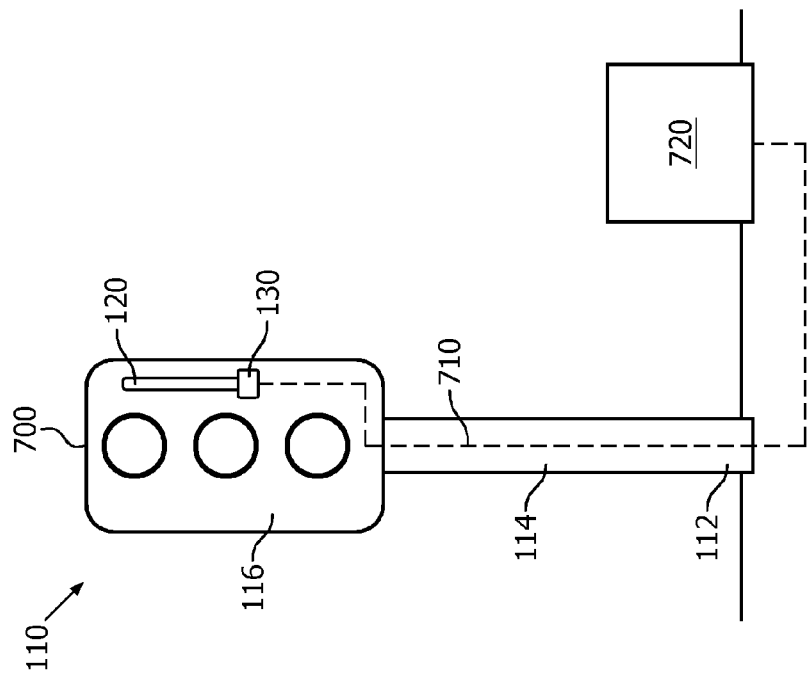
FIG. 7 shows schematically an embodiment of the system according to the invention applied to a traffic light.

In FIG. 7 the pole 110 comprises a traffic light with a signal head 700. The antenna 120 and signal processor 130 are coupled to the signal head 700 (e.g. attached to the signal head 700 inside an enclosure). The signal processor is coupled through a wire 710, embedded in the pole 110 and signal head 700, to a control box 720 that controls the traffic light and carries out the functions of the processor 140. As an example, the control box can, when the processor 140 determines that the traffic light has been physically deformed, control all other traffic lights at the intersection where the physically deformed traffic light is located to switch to a mode in which, for example, the orange light blinks on and off in order to warn oncoming traffic of this dangerous situation.

Figure 8:
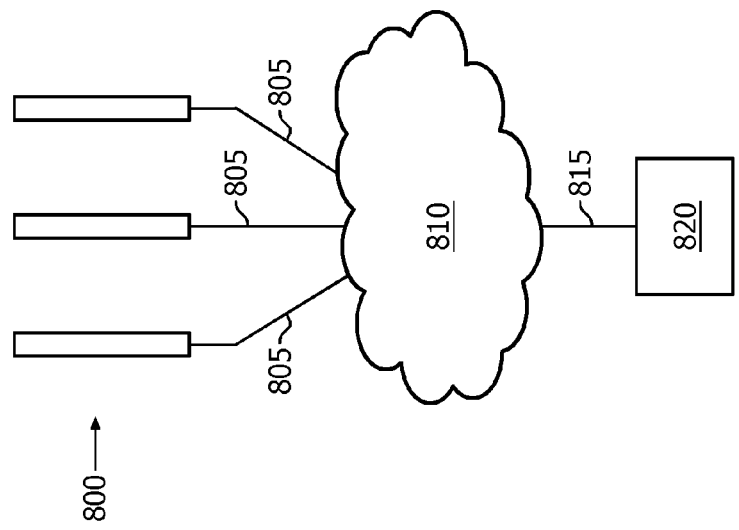
FIG. 8 shows schematically an embodiment of the system according to the invention comprising multiple poles coupled to a processor though a communications network.

FIG. 8 depicts a system according to the invention comprising multiple poles 800 each equipped with an antenna and signal processor (not shown). Each pole of the multiple poles 800 is coupled via a link 805 to a communications network (e.g. the Internet, or a city wide network) 810. There is a connection 815 from the communications network 810 to a server 820 which provides the functionality of the processor (not shown). In this example, each pole of the multiple poles 800 can be addressable in the communications network 810 and the server 820 can (periodically) poll position data, store such position data and compare the most recent position data to the stored position data. The server 820 can report on the status of (each of) the multiple poles 800 and include other relevant information (e.g. information related to the failure of lighting devices).

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. In the unit claims enumerating several means, several of these means can be embodied by one and the same item of hardware. The usage of the words first, second and third, etcetera do not indicate any ordering. These words are to be interpreted as names. No specific sequence of acts is intended to be required unless specifically indicated.

The invention claimed is:
1. A system for detecting physical deformation of ea plurality of poles, the system comprising:
   a plurality of poles, each pole including,
      an antenna, coupled to the pole, arranged for receiving a wireless signal; and
      a signal processor, coupled to the antenna, arranged for determining first and second position data based on the received wireless signal for a first and second time period; and
   a processor arranged to analyze the first and second position data from a first and second pole of the plurality of poles and determine if either pole has been physically deformed between the first time period and the second time period, by first determining a variation between the first and second position data of each respective pole and if a positive variation if found in either pole, checking for a false positive variation by determining a second variation in position data between the first pole and second pole.

2. The system of claim 1 wherein each signal processor is arranged to determine position data based on information encoded in the wireless signal.
3. The system of claim 1 wherein each signal processor is arranged to determine position data based on timing information related to receiving the wireless signal.
4. The system of claim 1 wherein each signal processor is arranged to determine position data based on measuring signal strength of the wireless signal.
5. The system of claim 1, wherein the each antenna and signal processor in combination form a receiver for a satellite navigation system and wherein the antenna is arranged to receive a wireless signal from a satellite and the signal processor is arranged to determine a geographic location as position data.
6. The system of claim 5, wherein the receiver is a GPS, GLONASS, Galileo, Beidou, COMPASS, IRNSS or QZSS receiver.
7. The system of claim 6, wherein the processor is coupled to the first or second pole.
8. The system of claim 6, wherein the processor is at a location remote to the first or second pole.
9. The system of claim 1, wherein one or more of the plurality of poles includes an integrated signal processor and processor.
10. A method for detecting physical deformation of one or more poles, the method comprising the steps of:
   determining at least first position data for each of first and second poles, in a first time period, based on a wireless signal received through respective antennas coupled to the first and second poles;
   determining at least second position data for each of the first and second poles, in a subsequent time period, based on the wireless signals received through the antennas;
   determining whether either pole has been physically deformed by first determining a variation between the at least first position data and the at least second position data of each respective pole and if a positive variation if found in either pole, checking for a false positive variation by determining a second variation in position data between the first and second poles.
11. A computer readable, non-transitory medium having stored therein instructions for causing a processing unit to execute a method for detecting physical deformation of one or more poles, the medium comprising code for:
   determining at least first position data for each of first and second poles, in a first time period, based on a wireless signal received through respective antennas coupled to the first and second poles;
   determining at least second position data for each of the first and second poles, in a subsequent time period, based on the wireless signals received through the antennas;
   determining whether either pole has been physically deformed by first determining a variation between the at least first position data and the at least second position data of each respective pole and if a positive variation if found in either pole, checking for a false positive variation by determining a second variation in position data between the first and second poles.

* * * * *